Dec. 16, 1958 W. L. IKARD ET AL 2,864,568
AIR-FLOW DIRECTION PICKUP
Filed Dec. 30, 1955 2 Sheets-Sheet 1

INVENTORS
WALLACE L. IKARD
EDMUND A. BRUMMER

BY
R. J. Tompkins
ATTORNEYS

Dec. 16, 1958 W. L. IKARD ET AL 2,864,568
AIR-FLOW DIRECTION PICKUP
Filed Dec. 30, 1955 2 Sheets-Sheet 2
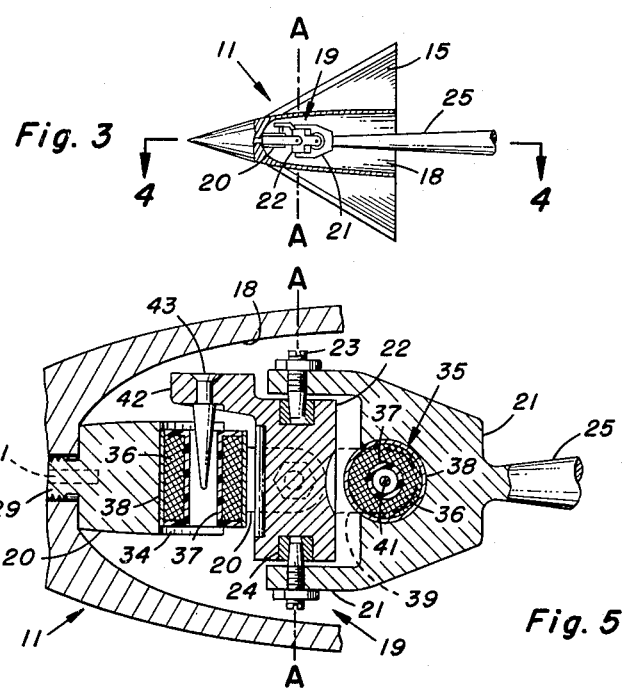
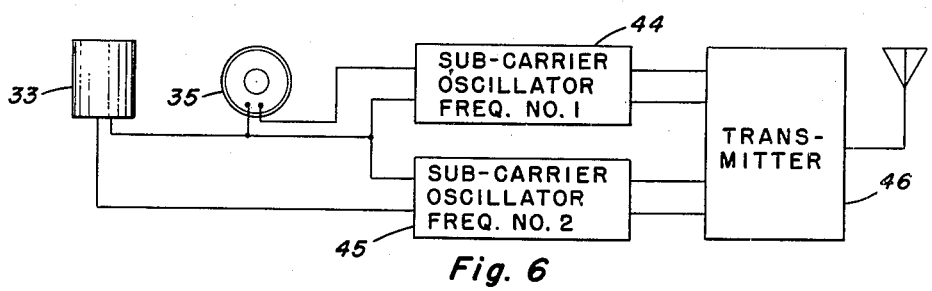
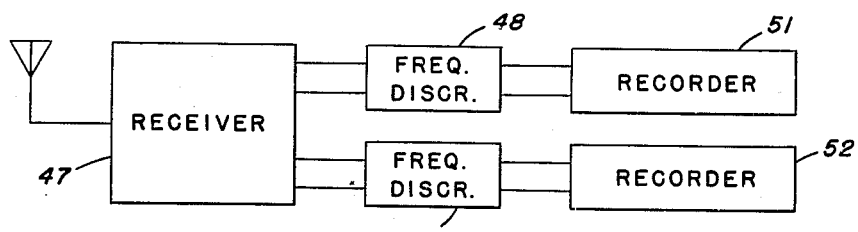
INVENTORS
WALLACE L. IKARD
EDMUND A. BRUMMER
BY
R. J. Tompkins
ATTORNEYS United States Patent Office 2,864,568
Patented Dec. 16, 1958

2,864,568

AIR-FLOW DIRECTION PICKUP

Wallace L. Ikard, Tulsa, Okla., and Edmund A. Brummer, Hampton, Va., assignors to the United States of America as represented by the Secretary of the Navy Application December 30, 1955, Serial No. 556,752

2 Claims. (Cl. 244—14)

(Granted under Title 35, U. S. Code (1952), sec. 266)

The invention described herein may be manufactured and used by or for the Government of the United States of America for governmental purposes without the payment of any royalties thereon or therefor.

The present invention relates generally to telemetering apparatus for pilotless aircraft, more particularly the invention relates to apparatus for determining the attitude of an aircraft with respect to the relative wind direction and wherein separate variable inductance outputs are provided for indicating variations in such attitude on a plurality of axes.

While various prior art instruments have been employed to measure air-flow directions, these instruments have been found to be unsuitable for use with high speed pilotless aircraft because of large size and the inability thereof to withstand the high accelerations and aerodynamic loads which are encountered in such use.

The device of the present invention provides a sufficiently high accuracy of measurement during heat build-up under high velocity and presents a small frontal area which is of importance in consideration of the small size and high speeds attainable by the rocket-propelled models on which the instrument is usually employed. In measuring the angle of air-flow with respect to the aircraft, a pair of coils are provided, one having the axis thereof mounted vertically with respect to the aircraft and the other having the axis thereof mounted horizontally with respect to the aircraft. An aerodynamic body provided with stabilizing fins is mounted for rotary motion on vertical and horizontal axes on a support which is attached to the aircraft or aircraft model. A universal coupling or joint is used to provide for the angular motion of the aerodynamic body in accordance with air-flow direction with respect to the aircraft. Incorporated in the universal coupling, a pair of conical cores are positioned substantially axially within the aforementioned coils. As the body changes position angularly on the vertical and horizontal areas of the universal coupling, the conical cores are moved with respect to the coils, thus varying the inductive relation therewith to change the output of the coils in direct proportion to the change in angle of the body.

An object of the present invention is to provide an air-flow direction pickup which is aerodynamically stable.

Another object is to provide an air-flow direction pickup which while occupying little space is capable of telemetering signals indicating, with high accuracy, the relative air-flow direction with respect to the axes of an aircraft on which the pickup is mounted.

Still another object is to provide an air-flow direction pickup having the foregoing qualities and which is light in weight, resistant to heat build-up encountered at supersonic speeds and is economical to manufacture.

Other objects and many of the attendant advantages of this invention will be readily appreciated as the same becomes better understood by reference to the following detailed description when considered in connection with the accompanying drawings wherein:

Fig. 3 is an enlarged view of the head portion of the device of the present invention and having the head portion broken away to show the universal coupling therefor;

Fig. 5 is a sectional view taken along the line 5—5 of Fig. 4.

Figure 1:
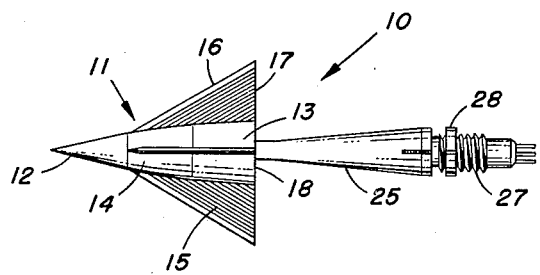
Fig. 1 is a side elevation of the air-flow direction pickup of the present invention.
Figure 2:
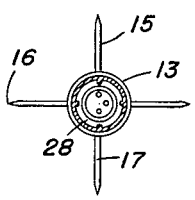
Fig. 2 is a rear elevation thereof.

Fig. 6 is a schematic diagram showing in block form the oscillators and transmitter of a telemetering circuit suitable for use with the present invention; and Fig. 7 is a schematic diagram showing a suitable receiving circuit in block form and showing frequency discriminators and recorders for receiving signals from the transmitter indicative of variations in inductance of the coils in accordance with changes in attitude of the aerodynamic body in accordance with air-flow direction.

Referring more particularly to the drawings wherein like numerals indicate like parts throughout the several views, 10 indicates generally the device of the present invention which comprises a body or head 11 having conically shaped leading and tail portions 12 and 13, respectively, and an intermediate curved portion 14. A plurality of vertical and horizontal stabilizing delta-shaped vanes or blades 15 are mounted on portions 13 and 14 of the body 11. The leading edge of each blade 15 is sharpened as at 16, while the trailing edge thereof is blunt as at 17.

Body 11 is hollowed out as at 18 to receive a universal joint indicated generally at 19 and having a leading horizontal yoke member 20 and a trailing vertical yoke member 21. It is, of course, understood that the leading yoke may be vertically mounted and the trailing yoke may be transversely mounted without departing from the spirit of the invention. Yokes 20 and 21 are pivotally joined to an axial block member 22 by pins 23 set in sleeve bearings 24 as shown particularly in Figs. 4 and 5. Pins 23 and sleeve bearings 24 may be provided with means for adjusting the clearance therebetween, such, for example, as providing pins 23 with a taper at one end thereof and having threaded connection with yokes 20 and 21 whereby pins 23 may be moved into close contact with tapered bore sleeves 24 thus to eliminate excessive play therebetween. It is to be understood that the particular of bearing adjustment shown is merely for illustration and any suitable means for accomplishing the result may be employed.

Figure 4:
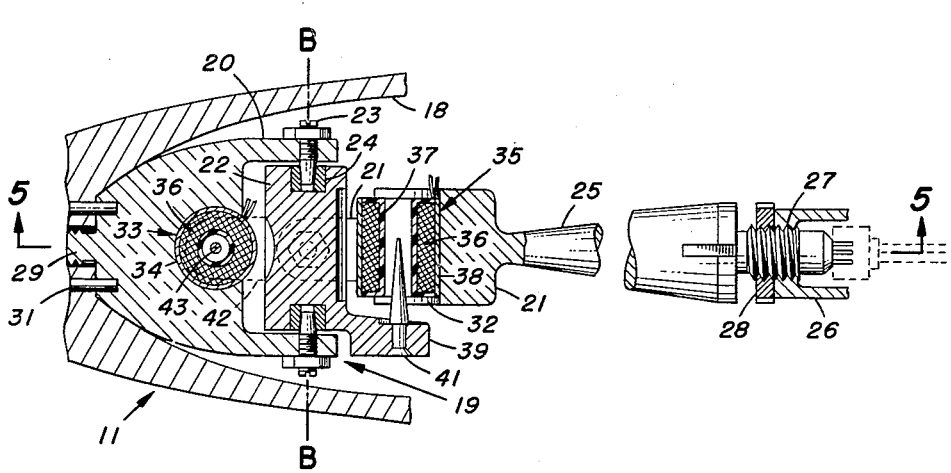
Fig. 4 is a sectional view taken along the line 4—4 of Fig. 3.

As shown in Figs. 4 and 5, yoke 20 and the pins 23 thereof from a horizontal axis B, while yoke 21 and the pins 23 thereof form a vertical axis A.

Trailing yoke 21 is formed integrally with or may be fixed in any desired manner to a supporting member or sting 25 which is mounted forwardly of an aircraft 26 by means of threaded end 27 of member 25 and locknut 28.

Leading yoke 20 is fixed in body 11 in hollowed out portion 18 by means of threaded extension 29 having a nut (not shown) and a pair of locating pins 31 which firmly lock the body with respect to the yoke 20 thus assuring alignment of the vertical and horizontal axes A and B, respectively, of the joint 19 and the vertical and horizontal vanes 15 of the body 11.

Mounted in partial bore 32 in vertical yoke 21 is coil 35. Mounted in partial bore 34 in horizontal yoke 20 is a coil 33. Coils 33 and 35 preferably comprise windings of enamelled copper wire 36 wound on plastic spools 37 and enclosed in powdered iron enclosures 38. Horizontally mounted on rearwardly extending arm 39 formed on block member 22 is a conically shaped powdered iron core 41. Core 41 moves in horizontal directions into and out of coil 35 thus to change the inductive coupling between core 41 and coil 35 in accordance with horizontal changes in attitude of the body 11, such motion being transmitted through yoke 20, the pins 23 thereof and through the pivotal motion of block 22 on pins 23 of yoke 21.

Vertically mounted on forwardly extending arm 42 formed on block member 22 is a conically shaped powdered iron core 43. Core 43 moves in vertical directions into and out of coil 33 thus to change the inductive coupling between core 43 and coil 33 in accordance with vertical changes in attitude of the body 11. Thus the inductance of coil 33 is affected by motion of core 43 when body 11 is rotated on axis B and the inductance of coil 35 is affected by motion of core 41 when body 11 is rotated on axis A.

The variable inductance outputs of coils 33 and 35 may be fed to resonant inductance-capacitance circuits of separate sub-carrier oscillators 44 and 45, respectively, as shown in the diagram of Fig. 6. The oscillators, operating in different frequency bands between 100 and 200 kc. p. s., simultaneously amplitude-modulate a 217 mc. p. s. carrier; this modulation is transmitted by transmitter 46 from the aircraft to a ground receiving station 47 shown in Fig. 7. At the station 47, the subcarrier frequencies are separated and fed into individual frequency discriminators 48 and 49 which produce direct-current outputs proportional to the frequency deviations of the subcarrier oscillators 44 and 45. These current outputs are passed into recorders 51 and 52 which may be multichannel oscillographs. It is, of course, understood that any suitable telemetering circuit may be employed with the device of the present invention, the foregoing arrangement being merely illustrative of a suitable circuit.

The device of the present invention provides a sting-mounted vane-stabilized head or body which is pivoted well ahead of the aerodynamic center of pressure thereof on a free-swivelling universal joint. Body and vanes are combined to rotate as a unit on the axes A and B of the universal joint; thus, the aerodynamic surfaces are placed ahead of all fixed parts of the device. The body in external configuration is ogival and has conical tip and afterbody portions. The axes A and B of the universal joint and the axis of the instrument mounting intersect at a common point.

If, as in the present case, the axis A of the device is mounted at right angles to the lateral axis of the aircraft, the local angle of attack and angle of sideslip are indicated by variations of output of coils 33 and 35, respectively. The foregoing terms as used herein are defined as follows: Angle of attack: The acute angle between two planes. One plane includes the lateral and longitudinal axes of the aircraft, the other plane includes the lateral axis of the aircraft and the relative wind vector. Angle of sideslip: The acute angle between the plane of symmetry of the aircraft and the relative wind vector.

If desired the device may be modified to provide a single axis flow direction pickup which is smaller in size and is used on models where the size of the preferred form of the device is objectionable or where only one measurement is necessary. This form of the invention (not shown) is modified by eliminating one pair of vanes and the associated axis of rotation and the coil and core therefor.

In the present description the term horizontal is used to indicate a plane parallel to the lateral axis of an aircraft and vertical is used to indicate a plane at right angles thereto.

The aerodynamic performance of the device of the present invention is indicated by the natural frequency of the instrument at Mach numbers from 0.3 to 1.96 which varies from 31 C. P. S. to 350 C. P. S. at sea level and from 10.5 C. P. S. to 120 C. P. S. at an altitude of 50,000 feet. In order to maintain a reasonable amount of damping when the instrument is operating at high altitudes, it may be desirable to introduce a small amount of high viscosity silicone fluid into the sleeve bearings 24 of the universal joint 19. It has been found that under ordinary conditions that such damping is not necessary provided the device is securely mounted and kept out of fluctuating flow disturbances caused by the aircraft.

Obviously many modifications and variations of the present invention are possible in the light of the above teachings. It is therefore to be understood that within the scope of the appended claims the invention may be practiced otherwise than as specifically described.

What is claimed is:

1. An airflow-direction pickup for aircraft comprising, means for supporting said pickup on said aircraft, an aerodynamic body, universal joint means having vertical and horizontal axes and block means for joining said body to said supporting means for rotation on said vertical and horizontal axes, first coil means fixed on said body and having the axis thereof parallel with said horizontal axis, a first core for said first coil fixed on said block means, said first coil pivoting on said horizontal axis with respect to said first core and in accordance with vertical motion of said body to provide an induced current in said coil and variable in accordance to the motion thereof with respect to said first core, second coil means fixed on said supporting means and having the axis thereof parallel with said vertical axis, a second core for said second coil fixed on said block means, said second core pivoting with respect to said second coil on said vertical axis and in accordance with horizontal motion of said body to provide an induced current in said second coil and variable in accordance to the motion of said second core with respect thereto, and means for transmitting signals indicative of said variations in induced current of said first and second coils.

2. A pick-off mechanism comprising a universal joint having vertical and horizontal axes; said universal joint having a fixed portion, a movable portion, and an axial block member for joining said movable portion on said fixed portion for rotation on said vertical and horizontal axes; a first induction coil mounted on said fixed portion and having the axis thereof parallel with said horizontal axis; a second induction coil mounted on said movable portion and having the axis thereof parallel with said vertical axis; a first core mounted on said axial block and rotatable therewith about said vertical axis substantially along the axis of said first coil; and a second core mounted on said axial block; said second coil being rotatable with said movable portion about said horizontal axis substantially along the axis of said second core; said first and second cores being conical in shape whereby substantially linear outputs are provided by said first and second coils in response to relative movement of said first and second cores respectively.

References Cited in the file of this patent

UNITED STATES PATENTS

| | | |
|---|---|---|
| 2,013,106 | Nagel | Sept. 3, 1935 |
| 2,427,872 | Newman | Sept. 23, 1947 |
| 2,524,747 | Ayers | Oct. 10, 1950 |
| 2,662,402 | Ince | Dec. 15, 1953 |